UNITED STATES PATENT OFFICE 2,319,777

PROCESS FOR THE PRODUCTION OF A METARSENITE

Marc Le Duc, Antioch, Calif.

No Drawing. Application June 22, 1939,
Serial No. 280,651

4 Claims. (Cl. 23—53)

This invention relates to the production of metarsenites, particularly those of alkali metals and earth alkali metals. The invention is particularly concerned with production of various metarsenites of high purity. The value of metarsenites as insecticides is largely measured by their arsenite content. The process of this invention enables one to produce substantially anhydrous metarsenites of a high arsenite content.

In the prior art, sodium arsenites were produced by either boiling a mixture of sodium hydroxide with arsenous oxide, a solution of sodium carbonate with arsenous oxide, or a solution of potassium hexarsenite with arsenous oxide. The rate of solubility of arsenous oxide in the above liquors is low and therefore it was necessary to boil the mixtures for hours before the oxide completely reacted. Furthermore, in all of the above methods of the prior art, evaporation is required to obtain the salt.

According to the present invention, salts of mesotetrarsenious acid $H_4As_4O_8$ or metarsenites can be formed directly and in an anhydrous condition without the formation of $NaH_2AsO_3$ for example. The presence of this compound is undesirable because further heating is required to remove the mol of water still remaining. Also, when arsenites are heated some arsenate and free arsenic are formed, thus further reducing the arsenite content.

I have found that a suitable hydroxide and arsenous oxide can be reacted dry by heating a finely divided mixture of the two to start the reaction. Since the reaction is exothermic when once started, it will be continued without any further addition of heat. The material produced is dry and after reacting needs no further processing.

The reaction can be represented thus:

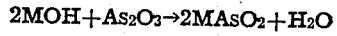

$$2MOH + As_2O_3 \rightarrow 2MAsO_2 + H_2O$$

wherein M is generally representative of an alkali metal or an earth alkali metal. When M is divalent instead of monovalent the reaction is represented thus:

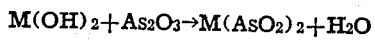

$$M(OH)_2 + As_2O_3 \rightarrow M(AsO_2)_2 + H_2O$$

Thus, the reaction can be carried on simply and expeditiously in the dry state by mixing together finely ground dry arsenous oxide and sodium hydroxide and heating the dry fine mixture slightly. Initial heating is required to start the reaction, but once started, it continues and additional dry mixture of the two materials can be added and reacted because the reaction is sufficiently exothermic.

The materials should be finely divided for I have found that if too large a proportion of coarse particles are present the reaction will not go to completion or will not continue itself. If the particles are all finer than 30 mesh, that is all the particles will pass a screen having 30 openings per inch, or the average particle size is less than 30 mesh, the reaction goes to completion and the product is anhydrous.

The reaction can be carried out in any suitable equipment or apparatus. The equipment should be such, suitably insulated, for example, that once the reaction has started the temperature can raise and remain at or above 100° C. to drive off water formed during the reaction. The reaction can be carried out in batches or continuously. Once initiated it proceeds to completion, if the temperature is maintained, to produce a dry metarsenite which requires no further processing.

The temperature of the reaction should be kept below the sublimation temperature of the arsenous oxide and I have successfully operated by initially heating under one atmosphere pressure to a temperature of about 80° C. As the reaction proceeds, the temperature rises and water is driven off as formed. The end product is largely anhydrous sodium arsenite. In place of caustic soda, caustic potash can be employed, as can sodium and potassium carbonate, or any one of the carbonates, hydroxides, or oxides of the earth alkali metals, including barium, strontium, calcium, and magnesium. Two mols of a hydroxide containing a monovalent cation are required for one of the oxide and only one mol of a hydroxide containing a divalent cation. Adjustment should be made for the initial purity of the materials in determining the actual weights of materials supplied to furnish the stoichiometric quantities required. When a carbonate is used, carbon dioxide and not water is liberated, and with an oxide, only the arsenite is formed.

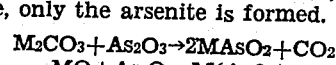

$$M_2CO_3 + As_2O_3 \rightarrow 2MAsO_2 + CO_2$$
$$MO + As_2O_3 \rightarrow M(AsO_2)_2$$

With some of these materials, for example soda ash, a temperature closely approaching or above the sublimation temperature of arsenious oxide is required for the reaction to go to completion. By heating under pressure the requisite higher temperature can be reached and still be kept below the sublimation temperature of arsenious oxide at the pressure employed.

I claim:

1. A continuous process for the manufacture of a metarsenite consisting in forming a mixture of dry, finely divided arsenious oxide and a dry finely divided solid material selected from the group consisting of the hydroxides, carbonates and oxides of the earth alkali metals and the hydroxides and carbonates of the alkali metals, said arsenious oxide and said material being present in said mixture in amounts corresponding to those required stochiometrically to form said metarsenite, initially heating the mixture to start reaction between said arsenious oxide and said material, thereafter adding additional mixture to that undergong reaction to continue said reaction and maintain the temperature of the material undergoing reaction at substantially 100° C. without the addition of further heat.

2. A continuous process for the manufacture of a metarsenite consisting in forming a mixture of dry, finely divided arsenious oxide and a dry, finely divided solid material selected from the group consisting of the hydroxides, carbonates and oxides of the earth alkali metals and the hydroxides and carbonates of the alkali metals, said arsenious oxide and said material being present in said mixture in amounts corresponding to those required stochiometrically to form said metarsenite, and maintaining the temperature of between about 80° C. and about 100° C. to react said arsenious oxide and said material and leave a dry, white friable, metarsenite as the product.

3. A process for the manufacture of a metarsenite comprising mixing together, in the weight proportions required stochiometrically to form a metarsenite, dry, finely divided arsenious oxide and a dry, finely divided solid material selected from the group consisting of the hydroxides, carbonates and oxides of the earth alkali metals and the hydroxides and carbonates of the alkali metals, and heating the dry mixture under about atmospheric pressure to a temperature maintained at about 80° C. to react said materials and form said metarsenite.

4. A process for the manufacture of a metarsenite comprising mixing together, in the weight proportions required stochiometrically to form a metarsenite, dry, finely divided arsenious oxide and a dry, finely divided solid material selected from the group consisting of the hydroxides, carbonates and oxides of the earth alkali metals and the hydroxides and carbonates of the alkali metals, and heating the dry mixture to about 100° C. to initiate reaction of said materials to form said metarsenite and thereafter maintaining said mixture at a temperature not substantially in excess of 100° C.

MARC LE DUC.